US012476529B2

United States Patent
Choi et al.

(10) Patent No.: US 12,476,529 B2
(45) Date of Patent: Nov. 18, 2025

(54) SWITCHING CONVERTER EQUIPPED WITH ADAPTIVE FREQUENCY CONTROL FUNCTION

(71) Applicants: SILICON MITUS, INC., Seongnam-Si (KR); SILICON-MAGIC SEMICONDUCTOR TECHNOLOGY (HANGZHOU) CO., LTD., Hangzhou (CN)

(72) Inventors: Jin Wook Choi, Yongin-Si (KR); Seok Won Choi, Pyeongtaek-Si (KR); Jung Su Choi, Seoul (KR); Gi Chur Bae, Seongnam-Si (KR)

(73) Assignees: Silicon Mitus, Inc., Seongnam-si (KR); SILICON-MAGIC SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 162 days.

(21) Appl. No.: 18/403,203

(22) Filed: Jan. 3, 2024

(65) Prior Publication Data

US 2024/0266937 A1 Aug. 8, 2024

(30) Foreign Application Priority Data

Feb. 3, 2023 (KR) .......................... 10-2023-0014705

(51) Int. Cl.
*H02M 1/00* (2007.01)
*H02M 3/158* (2006.01)

(52) U.S. Cl.
CPC ......... *H02M 1/0009* (2021.05); *H02M 3/158* (2013.01)

(58) Field of Classification Search
CPC ........................... H02M 1/0009; H02M 3/158
See application file for complete search history.

(56) References Cited

U.S. PATENT DOCUMENTS

| 8,742,744 | B2 | 6/2014 | Abu Qahouq | |
| 2006/0113974 | A1* | 6/2006 | Kan | H02M 3/156 323/282 |
| 2019/0052165 | A1* | 2/2019 | Zambetti | H02M 3/005 |

* cited by examiner

*Primary Examiner* — Rafael O De Leon Domenech
(74) *Attorney, Agent, or Firm* — Osha Bergman Watanabe & Burton LLP

(57) ABSTRACT

A switching converter equipped with an adaptive frequency control function includes a switching unit, an inductor, an output capacitor, a zero crossing detector that receives a signal of the switching node and a signal of the output terminal, that are fed back, and detects whether or not an inductor current flowing through the inductor crosses a zero point, a DCM/CCM detector that outputs an operation section discrimination signal that discriminates a current operation section by dividing the current operation section into a discontinuous conduction mode (DCM) operation section and a continuous conduction mode (CCM) operation section according to a zero crossing detection signal output by the zero crossing detector, a variable oscillator that changes and outputs a clock frequency signal according to the operation section discrimination signal output by the DCM/CCM detector, and a controller that controls switching of switches constituting the switching unit according to the clock frequency signal output by the variable oscillator.

5 Claims, 4 Drawing Sheets

SWITCHING CONVERTER EQUIPPED WITH ADAPTIVE FREQUENCY CONTROL FUNCTION

CROSS-REFERENCE TO RELATED APPLICATION

This application claims priority to Korean Patent Application No. 10-2023-0014705 filed on Feb. 3, 2023 and all the benefits accruing therefrom under 35 U.S.C. § 119, the contents of which are incorporated by reference in their entirety.

BACKGROUND

The present disclosure relates to a switching converter equipped with an adaptive frequency control function. More specifically, the present disclosure relates to a switching converter equipped with an adaptive frequency control function that can simultaneously optimize an efficiency in a low load area where the effect of switching loss is significant and a high load area where the effect of conduction loss is significant by dividing an operation section of a PWM type DC-DC switching converter into a light load section and a heavy load section and applying different operating frequencies to the load areas.

Generally, power loss of a DC-DC switching converter is mainly classified into conduction loss and switching loss.

Conduction loss is the power loss that occurs when current flows through resistance such as the on-resistance of the switches that constitute up the DC-DC switching converter and direct current resistance (DCR) of an inductor, and has a property proportional to each resistance and load current.

On the other hand, switching loss is the power loss that occurs in a process of repeatedly turning on and off switches that constitute the DC-DC switching converter, and has a property of increasing in proportion to an operating frequency of the switches.

The switching loss in the current pulse width modulation (PWM) type switching converter, which operates at a fixed frequency across all loads, appears constant depending on the load, and the conduction loss increases in proportion to the load. Therefore, relatively large switching loss occurs when driving a light load, which results in a decrease in the efficiency of the entire system.

Further, when the operating frequency is reduced in order to reduce the switching loss, the efficiency in the low load area is improved, but in the heavy load area, conduction increases rapidly due to an increase in inductor current ripple, which results in a severe decrease in the efficiency of high load.

CITATION LIST

Patent Literature

PTL 1: U.S. Pat. No. 8,742,744 B2

SUMMARY

One or more embodiments of the present disclosure provide a switching converter equipped with an adaptive frequency control function that can simultaneously optimize an efficiency in a low load area where the effect of switching loss is significant and a high load area where the effect of switching loss is significant by dividing an operation section of a PWM type DC-DC switching converter into a light load section and a heavy load section and applying different operating frequencies to the load areas.

One or more embodiments of the present disclosure also provide a switching converter equipped with an adaptive frequency control function that can achieve optimization of efficiency in the entire load section by using an operating frequency optimized for each operating region.

In accordance with one or more embodiments of the present disclosure, a switching converter equipped with an adaptive frequency control function is provided. The switching converter including a switching unit, an inductor connected between a switching node connected to the switching unit and a ground terminal, an output capacitor connected between an output terminal connected to the switching unit and a ground terminal, a zero crossing detector that receives a signal of the switching node and a signal of the output terminal that are fed back, and detects whether or not an inductor current flowing through the inductor crosses a zero point value, a DCM/CCM detector that outputs an operation section discrimination signal that discriminates a current operation section by dividing the current operation section into a discontinuous conduction mode (DCM) operation section and a continuous conduction mode (CCM) operation section according to a zero crossing detection signal output by the zero crossing detector, a variable oscillator that changes and outputs a clock frequency signal according to the operation section discrimination signal output by the DCM/CCM detector, and a controller that controls switching of switches constituting the switching unit according to the clock frequency signal output by the variable oscillator.

In the switching converter equipped with the adaptive frequency control function according to one or more embodiments of the present disclosure, the zero crossing detector may output the zero crossing detection signal when the inductor current reaches to approximately zero within one cycle.

In the switching converter equipped with the adaptive frequency control function according to one or more embodiments of the present disclosure, the DCM/CCM detector may determine the current operation section as the DCM operation section when the zero crossing detection signal is continuously received from the zero crossing detector and determine the current operation section as the CCM operation section when the zero crossing detection signal is not received from the zero crossing detector.

In the switching converter equipped with the adaptive frequency control function according to one or more embodiments of the present disclosure, the variable oscillator may output a clock frequency signal corresponding to a DCM operating frequency when the operation section discrimination signal output by the DCM/CCM detector indicates the DCM operation section and output a clock frequency signal corresponding to a CCM operating frequency higher than the DCM operating frequency when the operation section discrimination signal output by the DCM/CCM detector indicates the CCM operation section.

In the switching converter equipped with the adaptive frequency control function according to one or more embodiments of the present disclosure, the controller may control switching of the switches by applying a pulse width modulation (PWM) signal corresponding to the DCM operating frequency or the CCM operating frequency to gate terminals of the switches constituting the switching unit according to the clock frequency signal output by the variable oscillator.

One or more embodiments of the present disclosure provide a switching converter equipped with an adaptive frequency control function that can simultaneously optimize an efficiency in a low load area where the effect of switching loss is significant and a high load area where the effect of conduction loss is significant by dividing an operation section of a PWM type DC-DC switching converter into a light load section and a heavy load section and applying different operating frequencies to the load areas.

Further, one or more embodiments of the present disclosure provide a switching converter equipped with an adaptive frequency control function that can achieve optimization of efficiency in the entire load section by using an operating frequency optimized for each operating region.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
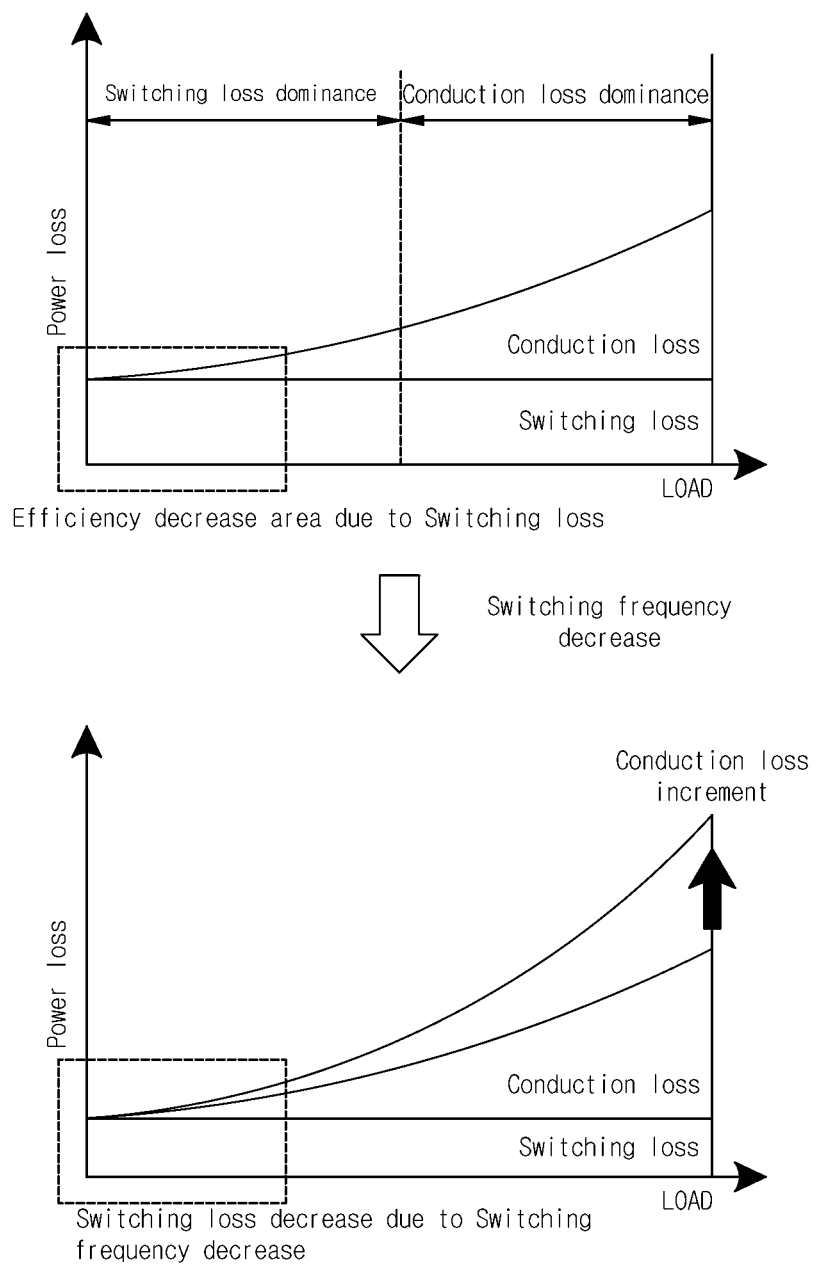
FIG. 1 is a diagram illustrating a change in power loss according to a change in switching frequency in a switching converter.

Specific structural or functional descriptions of the embodiments according to the concept of the present disclosure disclosed in this specification are merely illustrative for the purpose of describing the embodiments according to the concept of the present disclosure. The embodiments according to the concept of the present disclosure may be implemented in various forms and are not limited to the embodiments described in this specification.

Since the embodiments according to the concept of the present disclosure may be subjected to various changes and have various forms, the embodiments will be illustrated in the drawings and described in detail in this specification. However, this is not intended to limit the embodiments according to the concept of the present disclosure to specific disclosed forms, and the embodiments includes all changes, equivalents, or substitutes included in the spirit and technical scope of the present disclosure.

Unless otherwise defined, all terms used herein, including technical or scientific terms, have the same meaning as commonly understood by a person of ordinary skill in the technical field to which the present disclosure pertains. Terms as defined in commonly used dictionaries should be interpreted as having a meaning consistent with the meaning in the context of the related technology, and should not be interpreted in an idealized or overly formal sense unless clearly defined in this specification.

In the following, one or more embodiments of the present disclosure will be described in detail with reference to the accompanying drawings.

FIG. 1 is a diagram illustrating a change in power loss according to a change in switching frequency in a switching converter.

Referring to FIG. 1, the power loss of a DC-DC switching converter is mainly classified into conduction loss and switching loss.

The conduction loss is the power loss that occurs when current flows through resistance such as the on-resistance of the switches that make up the DC-DC switching converter and direct current resistance (DCR) of an inductor, and has a property proportional to each resistance and load current.

On the other hand, the switching loss is the power loss that occurs in a process of repeatedly turning on and off switches that constitute the DC-DC switching converter, and has a property of increasing in proportion to an operating frequency of the switches.

The switching loss in the current pulse width modulation (PWM) type switching converter, which operates at a fixed frequency across all loads, appears constant depending on the load, and the conduction loss increases in proportion to the load. Therefore, relatively large switching loss occurs when driving a light load, which results in a decrease in the efficiency of the entire system.

Further, when the operating frequency is reduced in order to reduce switching loss, the efficiency in the low load area may be improved, but in the heavy load area, conduction increases rapidly due to an increase in inductor current ripple, which results in a severe decrease in the efficiency of high load.

One or more embodiments of the present disclosure provide a switching converter equipped with an adaptive frequency control function that can simultaneously optimize an efficiency in a low load area where the effect of switching loss is significant and a high load area where the effect of conduction loss is significant by dividing an operation section of a PWM type DC-DC switching converter into a light load section and a heavy load section and applying different operating frequencies to the load areas.

As will be described in detail later, the basic DC-DC switching converter is configured with a controller that performs PWM modulation and a switching unit including switches and drivers for driving the switching node, and an operating frequency is determined by the frequency of a CLK signal. One or more embodiments of the present disclosure further include a zero crossing detector that detects zero crossing, a DCM/CCM detector that determines light/heavy load sections depending on whether or not a zero crossing detection signal occurs, and a variable oscillator that changes the CLK frequency depending on the load section.

One or more embodiments of the present disclosure use the zero crossing detector as a circuit to detect light load and heavy load operation sections, and operates to increase or decrease a switching frequency according to an output of the zero crossing detector. In a DCM operation, an inductor current decreasing to zero ampere within one cycle of the operating frequency and the DCM operation occurs when driving a light load. In a CCM operation, the inductor current does not decrease to approximately zero ampere (0 A) within one cycle and the CCM operation occurs when driving a heavy load. Therefore, by detecting whether or not the inductor current decreases to approximately zero ampere (0 A) within one cycle, the DCM operation/CCM operation and the load section of light load or heavy load can be determined.

In the following, one or more embodiments of the present disclosure will be described in detail.

Figure 2:
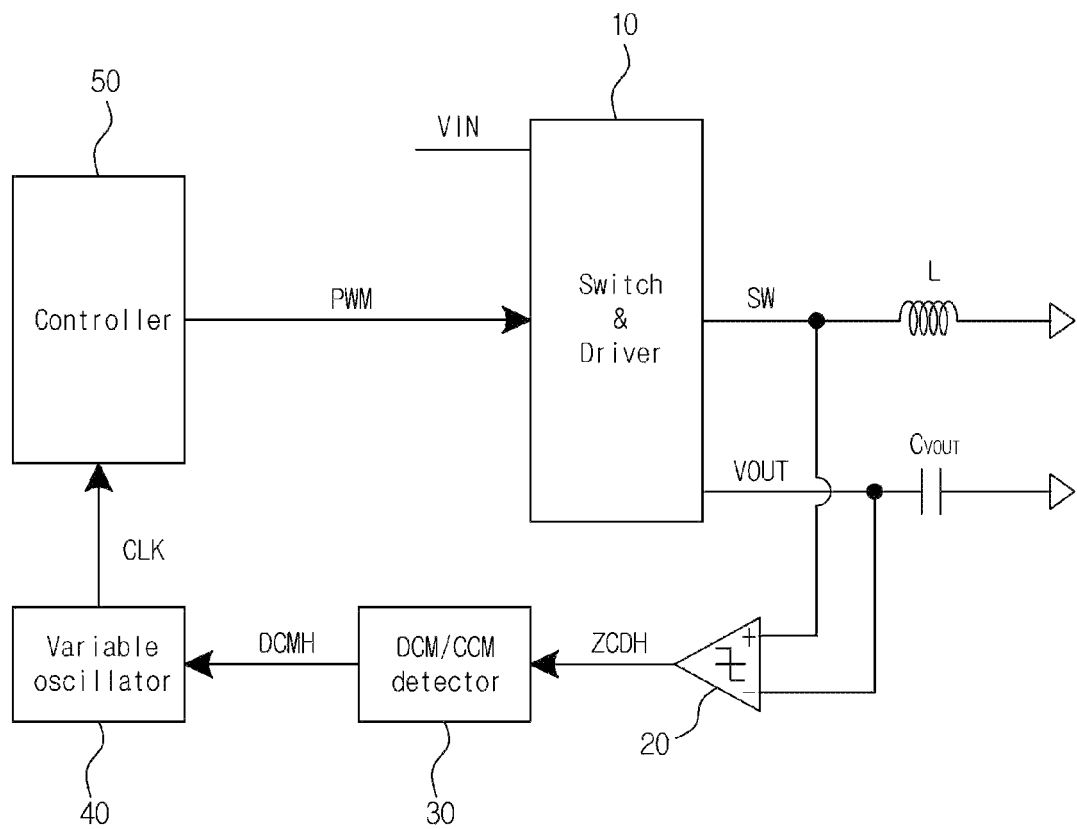
FIG. 2 is a diagram illustrating a switching converter equipped with an adaptive frequency adjustment function in accordance with one or more embodiments of the present disclosure.

FIG. 2 is a diagram illustrating a switching converter equipped with an adaptive frequency adjustment function according to one or more embodiments of the present disclosure.

Referring to FIG. 2, the switching converter equipped with the adaptive frequency control function according to one or more embodiments of the present disclosure includes a switching unit 10, an inductor L, an output capacitor $C_{VOUT}$, a zero crossing detector 20, a DCM/CCM detector 30, a variable oscillator 40, and a controller 50.

The switching unit 10 is configured with switches such as a field effect transistor FET, and is turned on and off under the control of the controller 50. In one or more embodiments, the switching converter equipped with the adaptive frequency control function according to one or more embodiments of the present disclosure may be configured to operate as a buck converter, boost converter, or buck-boost converter depending on a connection relationship between the switching unit 10, the inductor L, the output capacitor $C_{VOUT}$, an input terminal VIN, and an output terminal.

The inductor L is connected between a switching node SW connected to the switching unit 10 and a ground terminal. The switching node SW may be a node located between the switches constituting the switching unit 10. In one or more embodiments, when the switching unit 10 is configured with a first FET and a second FET, the switching node SW may be a node commonly connected to a source terminal of the first FET and a drain terminal of the second FET.

The output capacitor $C_{VOUT}$ is connected between the output terminal connected to the switching unit 10 and a ground terminal.

The zero crossing detector 20 receives a signal of the switching node SW and a signal of an output terminal VOUT, that are fed back, and detects whether or not an inductor current I_IND flowing through the inductor L crosses a zero point.

In one or more embodiments, the zero crossing detector 20 may be configured to output a zero crossing detection signal ZCDH when the inductor current I_IND reaches to approximately zero within one cycle.

The DCM/CCM detector 30 outputs an operation section discrimination signal DCMH that discriminates a current operation section by dividing the current operation section into a discontinuous conduction mode (DCM) operation section and a continuous conduction mode (CCM) operation section according to a zero crossing detection signal ZCDH output by the zero crossing detector 20.

In one or more embodiments, the DCM/CCM detector 30 may be configured to determine the current operation section as the DCM operation section when the zero crossing detection signal ZCDH is continuously received from the zero crossing detector 20.

Further, in one or more embodiments, the DCM/CCM detector 30 may be configured to determine the current operation section as the CCM operation section when the zero crossing detection signal ZCDH is not received from the zero crossing detector 20.

The variable oscillator 40 changes and outputs a clock frequency signal CLK according to the operation section discrimination signal DCMH output by the DCM/CCM detector 30.

In one or more embodiments, the variable oscillator 40 may be configured to output the clock frequency signal CLK corresponding to a DCM operating frequency $FSW_{DCM}$ when the operation section discrimination signal DCMH output by the DCM/CCM detector 30 indicates the DCM operation section.

Further, in one or more embodiments, the variable oscillator 40 may be configured to output the clock frequency signal CLK corresponding to a CCM operating frequency $FSW_{CCM}$ higher than the DCM operating frequency $FSW_{DCM}$ when the operation section discrimination signal DCMH output by the DCM/CCM detector 30 indicates the CCM operation section.

The controller 50 controls switching of the switches constituting the switching unit 10 according to the clock frequency signal CLK output by the variable oscillator 40.

In one or more embodiments, the controller 50 may be configured to control switching of the switches by applying a pulse width modulation PWM signal corresponding to the DCM operating frequency $FSW_{DCM}$ or the CCM operating frequency $FSW_{CCM}$ to gate terminals of the switches constituting the switching unit according to the clock frequency signal CLK output by the variable oscillator 40.

The operation configuration of the zero crossing detector 20, the DCM/CCM detector 30, the variable oscillator 40, and the controller 50 will be illustratively described in more detail by further referring to FIGS. 3 and 4 as follows.

Figure 3:
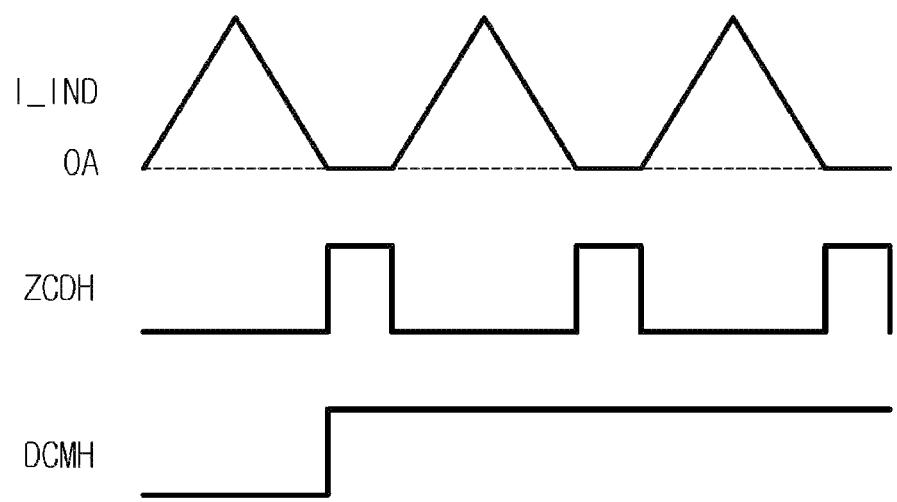
FIG. 3 is a diagram illustrating a signal timing diagram in a discontinuous conduction mode (DCM) in accordance with one or more embodiments of the present disclosure.

FIG. 3 is a diagram illustrating a signal timing diagram in the discontinuous conduction mode (DCM), according to one or more embodiments of the present disclosure.

Referring further to FIG. 3, the zero crossing detector 20 determines whether or not the inductor current I_IND decreases to approximately zero ampere (0 A) within one cycle. The zero crossing detector 20 outputs the zero crossing detection signal ZCDH when it is determined that the inductor current I_IND decreases to approximately zero ampere within one cycle and does not output the zero crossing detection signal ZCDH when it is determined that the inductor current I_IND does not decrease to approximately zero ampere within one cycle. According to one or more embodiments shown in FIG. 3, the zero crossing detector 20 continuously outputs the zero crossing detection signal ZCDH.

When the zero crossing detection signal ZCDH is continuously received from the zero crossing detector 20, the DCM/CCM detector 30 determines the current operation section as the DCM operation section and outputs the operation section discrimination signal DCMH to the variable oscillator 40.

When the operation section discrimination signal DCMH output by the DCM/CCM detector 30 indicates the DCM operation section, the variable oscillator 40 outputs the clock frequency signal CLK corresponding to the DCM operating frequency $FSW_{DCM}$.

The controller 50 generates a PWM signal PWM corresponding to the clock frequency signal CLK corresponding to the DCM operating frequency $FSW_{DCM}$ output by the variable oscillator 40 and applies the PWM signal PWM to the gate terminals of the switches constituting the switching unit 10.

Figure 4:
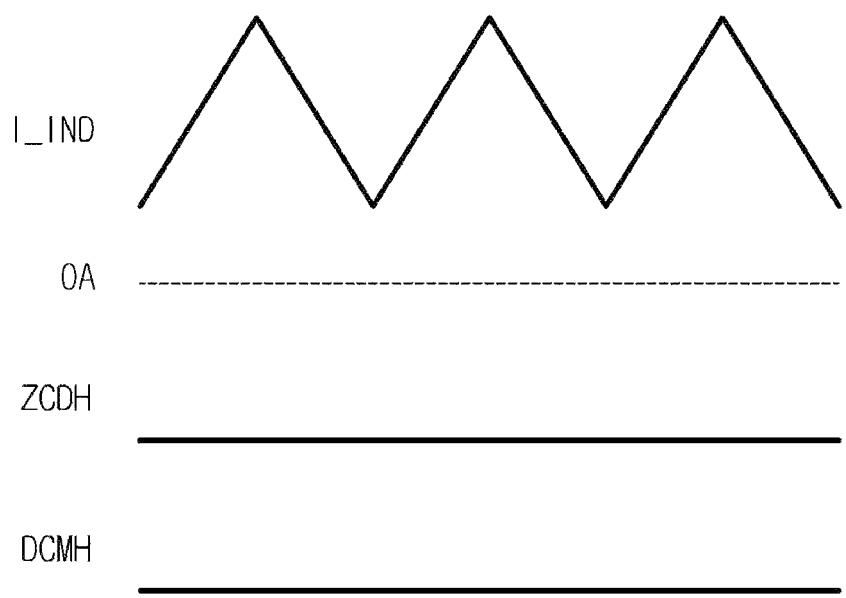
FIG. 4 is a diagram illustrating a signal timing diagram in a continuous conduction mode (CCM) in accordance with one or more embodiments of the present disclosure.

FIG. 4 is a diagram illustrating a signal timing diagram in the continuous conduction mode CCM according to one or more embodiments of the present disclosure.

Referring further to FIG. 4, the zero crossing detector 20 determines whether or not the inductor current I_IND decreases to approximately zero ampere (0 A) within one cycle. The zero crossing detector 20 outputs the zero crossing detection signal ZCDH when it is determined that the inductor current I_IND decreases to approximately zero ampere (0 A) within one cycle and does not output the zero crossing detection signal ZCDH when it is determined that the inductor current I_IND does not decrease to approximately zero ampere (0 A) within one cycle. According to one or more embodiments shown in FIG. 4, the zero crossing detector 20 does not output the zero crossing detection signal ZCDH.

When the zero crossing detection signal ZCDH is not received from the zero crossing detector 20, the DCM/CCM detector 30 determines the current operation section as the CCM operation section and outputs the operation section discrimination signal DCMH to the variable oscillator 40.

When the operation section discrimination signal DCMH output by the DCM/CCM detector 30 indicates the CCM operation section, the variable oscillator 40 outputs the clock frequency signal CLK corresponding to the CCM operating frequency $FSW_{CCM}$, and the CCM operating frequency $FSW_{CCM}$ is higher than the DCM operating frequency $FSW_{DCM}$.

The controller 50 generates a PWM signal PWM corresponding to the clock frequency signal CLK corresponding to the CCM operating frequency $FSW_{CCM}$ output by the variable oscillator 40 and applies the PWM signal PWM to the gate terminals of the switches constituting the switching unit 10.

Through the operations described with reference to the one or more embodiments shown in FIGS. 3 and 4, the switching converter equipped with the adaptive frequency control function can set an operating frequency that optimizes efficiency for each of DCM/CCM operation sections, and can increase power efficiency across all loads.

In the following, an automatic change operation in switching frequency when changing from the discontinuous conduction mode (DCM) to the continuous conduction mode (CCM) and when changing from the CCM to the DCM will be illustratively described in detail.

Figure 5:
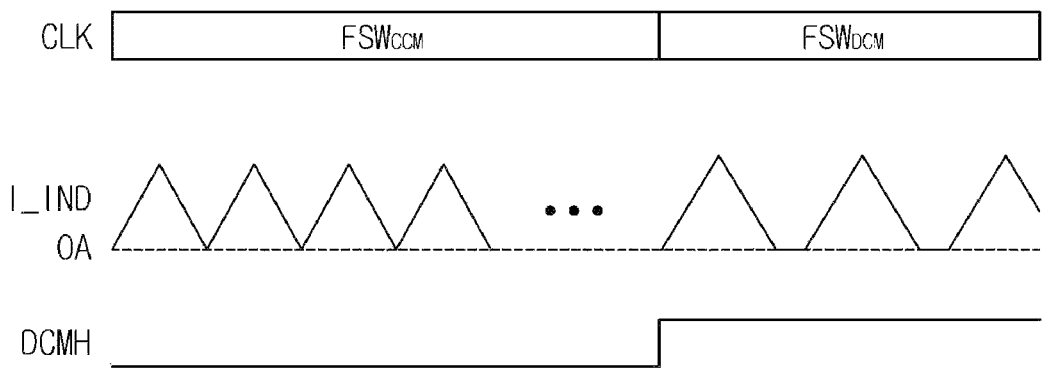
FIG. 5 is a diagram illustrating an automatic change in switching frequency when changing from the DCM to the CCM in accordance with one or more embodiments of the present disclosure.

FIG. 5 is a diagram illustrating an automatic change in switching frequency when changing from the DCM to the CCM according to one or more embodiments of the present disclosure.

Referring further to FIG. 5, in the DCM operation section, the zero crossing detector 20 outputs the zero crossing detection signal ZCDH at a high level, the DCM/CCM detector 30 determines the current operation section as the DCM operation section and outputs the operation section discrimination signal DCMH to the variable oscillator 40, the variable oscillator 40 outputs the clock frequency signal CLK corresponding to the DCM operating frequency $FSW_{DCM}$, and the controller 50 generates the PWM signal PWM corresponding to the clock frequency signal CLK corresponding to the DCM operating frequency $FSW_{DCM}$ output by the variable oscillator 40 and applies the PWM signal PWM to the gate terminals of the switches constituting the switching unit 10.

In the CCM operation section following the DCM operation section, the zero crossing detector 20 outputs the zero crossing detection signal ZCDH at a low level, the DCM/CCM detector 30 determines the current operation section as the CCM operation section and outputs the operation section discrimination signal DCMH to the variable oscillator 40, the variable oscillator 40 outputs the clock frequency signal CLK corresponding to the CCM operating frequency $FSW_{CCM}$ higher than the DCM operating frequency $FSW_{DCM}$ and the controller 50 generates the PWM signal PWM corresponding to the clock frequency signal CLK corresponding to the CCM operating frequency $FSW_{CCM}$ output by the variable oscillator 40 and applies the PWM signal PWM to the gate terminals of the switches constituting the switching unit 10.

Figure 6:
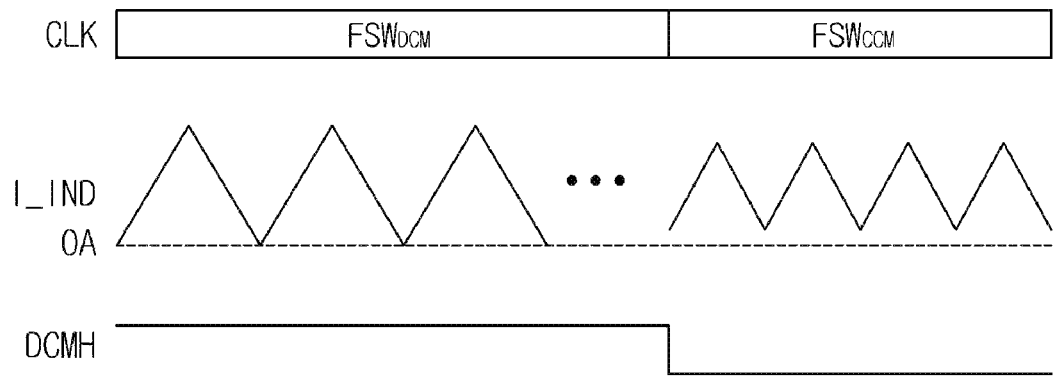
FIG. 6 is a diagram illustrating an automatic change in switching frequency when changing from the CCM to the DCM in accordance with one or more embodiments of the present disclosure.

FIG. 6 is a diagram illustrating the automatic change in switching frequency when changing from the CCM to the DCM according to one or more embodiments of the present disclosure.

Referring further to FIG. 6, in the CCM operation section, the zero crossing detector 20 outputs the zero crossing detection signal ZCDH at a low level, the DCM/CCM detector 30 determines the current operation section as the CCM operation section and outputs the operation section discrimination signal DCMH to the variable oscillator 40, the variable oscillator 40 outputs the clock frequency signal CLK corresponding to the CCM operating frequency $FSW_{CCM}$, and the controller 50 generates the PWM signal PWM corresponding to the clock frequency signal CLK corresponding to the CCM operating frequency $FSW_{CCM}$ output by the variable oscillator 40 and applies the PWM signal PWM to the gate terminals of the switches constituting the switching unit 10.

In the DCM operation section following the CCM operation section, the zero crossing detector 20 outputs the zero crossing detection signal ZCDH at a high level, the DCM/CCM detector 30 determines the current operation section as the DCM operation section and outputs the operation section discrimination signal DCMH to the variable oscillator 40, the variable oscillator 40 outputs the clock frequency signal CLK corresponding to the DCM operating frequency $FSW_{DCM}$ lower than the CCM operating frequency $FSW_{CCM}$ and the controller 50 generates the PWM signal PWM corresponding to the clock frequency signal CLK corresponding to the DCM operating frequency $FSW_{DCM}$ output by the variable oscillator 40 and applies the PWM signal PWM to the gate terminals of the switches constituting the switching unit 10.

Figure 7:
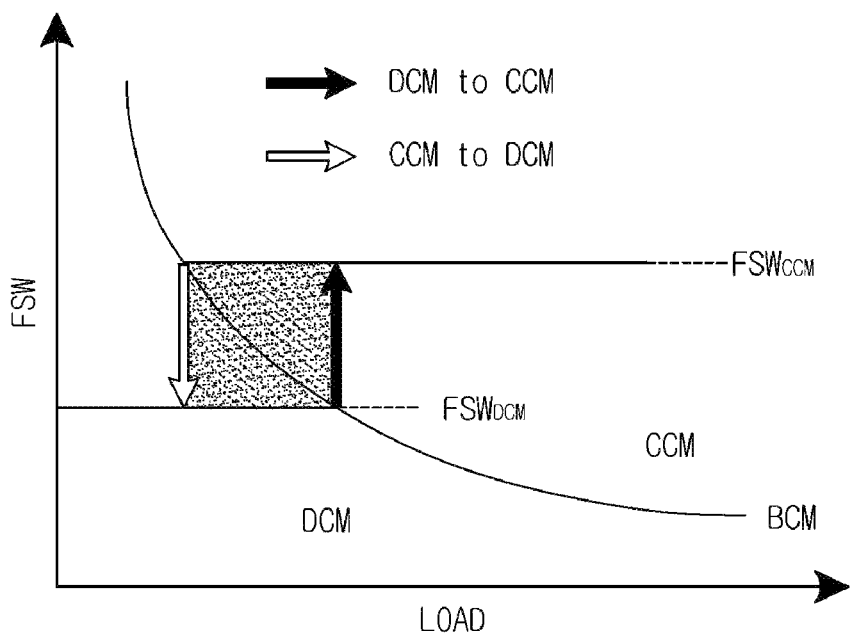
FIG. 7 is a diagram illustrating hysteresis characteristics by the automatic change in switching frequency in accordance with one or more embodiments of the present disclosure.

FIG. 7 is a diagram illustrating hysteresis characteristics by the automatic change in switching frequency according to one or more embodiments of the present disclosure.

Further referring to FIG. 7, it can be confirmed that hysteresis characteristics exist due to the automatic change in switching frequency when changing from the DCM to the CCM described with reference to FIG. 5 and when changing from the CCM to the DCM described with reference to FIG. 6.

As described in detail above, one or more embodiments of the present disclosure provide a switching converter equipped with an adaptive frequency control function that can simultaneously optimize an efficiency in a low load area where the effect of switching loss is significant and a high load area where the effect of conduction loss is significant by dividing an operation section of a PWM type DC-DC switching converter into a light load section and a heavy load section and applying different operating frequencies to the load areas.

Further, one or more embodiments of the present disclosure provide a switching converter equipped with an adaptive frequency control function that can achieve optimization of efficiency in the entire load section by using an operating frequency optimized for each operating region.

Although the switching converter equipped with the adaptive frequency control function has been described with reference to the specific embodiments, it is not limited thereto. Therefore, it will be readily understood by those skilled in the art that various modifications and changes can be made thereto without departing from the spirit and scope of the present disclosure defined by the appended claims.

What is claimed is:

1. A switching converter equipped with an adaptive frequency control function, the switching converter comprising:
   a switching unit;
   an inductor connected between a switching node connected to the switching unit and a ground terminal;
   an output capacitor connected between an output terminal connected to the switching unit and a ground terminal;
   a zero crossing detector configured to receive a signal of the switching node and a signal of the output terminal, that are fed back, and detect whether or not an inductor current flowing through the inductor crosses a zero point;
   a DCM/CCM detector configured to output an operation section discrimination signal that discriminates a current operation section by dividing the current operation section into a discontinuous conduction mode (DCM) operation section and a continuous conduction mode (CCM) operation section according to a zero crossing detection signal output by the zero crossing detector;
   a variable oscillator configured to change and output a clock frequency signal according to the operation section discrimination signal output by the DCM/CCM detector; and
   a controller configured to control switching of switches constituting the switching unit according to the clock frequency signal output by the variable oscillator.

2. The switching converter of claim 1, wherein
the zero crossing detector is configured to output the zero crossing detection signal when the inductor current reaches approximately zero within one cycle.

3. The switching converter of claim 2, wherein
the DCM/CCM detector is configured to:
   determine the current operation section as the DCM operation section when the zero crossing detection signal is continuously received from the zero crossing detector, and
   determine the current operation section as the CCM operation section when the zero crossing detection signal is not received from the zero crossing detector.

4. The switching converter of claim 3, wherein
the variable oscillator is configured to:
   output a clock frequency signal corresponding to a DCM operating frequency when the operation section discrimination signal output by the DCM/CCM detector indicates the DCM operation section, and
   output a clock frequency signal corresponding to a CCM operating frequency higher than the DCM operating frequency when the operation section discrimination signal output by the DCM/CCM detector indicates the CCM operation section.

5. The switching converter of claim 4, wherein
the controller is configured to:
   control switching of the switches by applying a pulse width modulation (PWM) signal corresponding to the DCM operating frequency or the CCM operating frequency to gate terminals of the switches constituting the switching unit according to the clock frequency signal output by the variable oscillator.

* * * * *